Oct. 30, 1951     C. L. NORDEN ET AL     2,573,593

SERVOMOTOR

Filed Jan. 31, 1947     2 SHEETS—SHEET 1

Inventors
Carl L. Norden
Theodore H. Barth
By Henry L. Shenier
Atty.

Oct. 30, 1951  C. L. NORDEN ET AL  2,573,593
SERVOMOTOR
Filed Jan. 31, 1947  2 SHEETS—SHEET 2
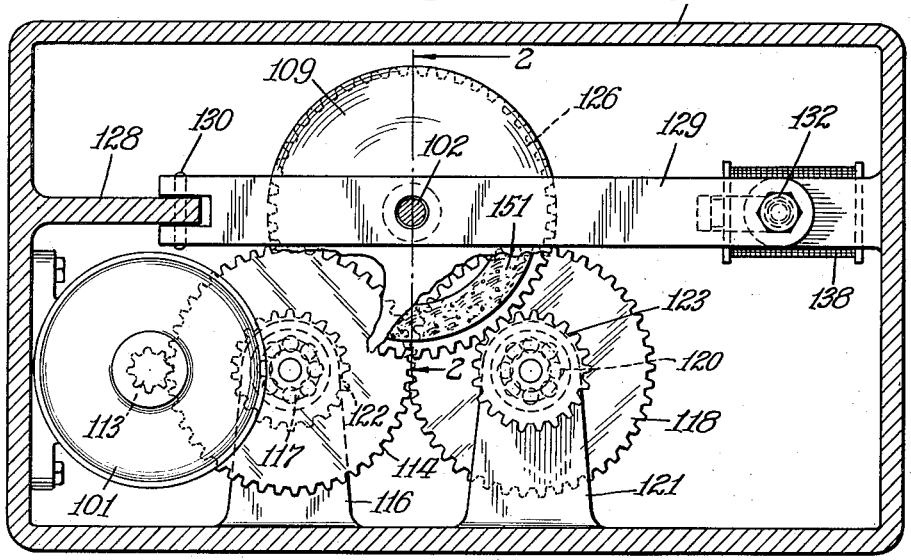
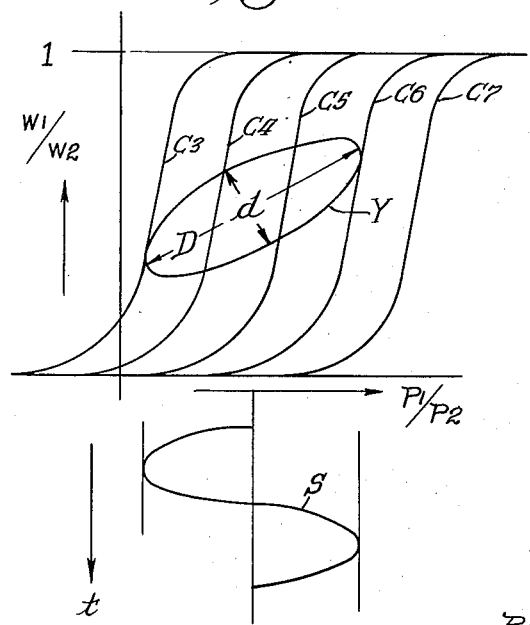
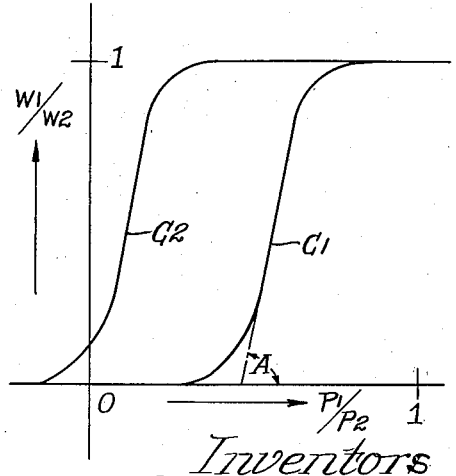
Inventors
Carl L. Norden
Theodore H. Barth
By Henry L. Shenier
Atty.

Patented Oct. 30, 1951

2,573,593

UNITED STATES PATENT OFFICE 2,573,593

SERVOMOTOR

Carl L. Norden, Zurich, Switzerland, and Theodore H. Barth, New York, N. Y., assignors, by mesne assignments, to The Norden Laboratories Corporation, White Plains, N. Y., a corporation of Connecticut Application January 31, 1947, Serial No. 725,604

12 Claims. (Cl. 192—4)

Our invention relates to servomotors, and more particularly to a servomotor of the clutch type capable of rotating a shaft in reversible directions of rotation at will, and at variable speeds between zero and the limit of speed of the driving means.

Servomotors of the clutch type of the prior art have been characterized by an on or off operation, that is to say, the output shaft is either stationary or rotates at the full coupled speed. There may be temporary conditions of instability in passing from coupled to uncoupled relation, which characteristic follows from the nature of the clutch devices used and the operating conditions under which such servomotors have been employed. For example, if the coefficient of friction of the clutch or drive disk surfaces and of the brake disk surfaces is constant or independent of the angular velocity of slip, the torque which can be handled by the output shaft will be fixed and it will be accelerated or decelerated, depending upon the relation between the load torque and the difference between the driving and braking torques of the servomotor. Such a device will therefore produce what is known as an "on or off" system in which the speed of the output shaft will rapidly reach its maximum value or rapidly stop, depending on whether or not the driving clutch is engaged or the braking element is engaged.

In our servomotor, we provide friction surfaces in which the coefficient of friction is substantially a rising function of the relative speed between the driving and driven means. Under these conditions, we are enabled to provide a servomotor of the clutch type of novel and improved construction in which a predetermined relationship exists between the output speed and an input control signal. We are enabled in a servomotor using a driving clutch and a braking clutch such that as the pressure on the driving clutch is increased, the pressure on the brake disk is correspondingly diminished until a point is reached at which the driving torque exceeds the braking and load torques and rotation of the output shaft occurs. At this point the relative velocity between the driving clutch member will decrease and the relative velocity between the rotary and stationary braking clutch members will increase correspondingly. Due to the fact that in our servomotor the clutching element is such that the dynamic coefficient of friction is a rising function of the slip velocity, the torque between the driving clutch member and the driven clutch member will decrease and the torque between the rotating and stationary brake members will increase. The result of this is that for a given pressure between the driving clutch member and the driven clutch member, acceleration of the output shaft will cease when the difference between the driving and braking torques equals the load torque. The output shaft speed hence will be stable and will be a function of the applied clutching pressure. As the clutching pressure increases, the effect will continue and a stabilization will occur at a condition of equilibrium between the driving torque and the sum of the braking and load torques. A similar rule of action will apply as the speed of the output shaft drops. In this case, the relative speed between the driving clutch member and the driven clutch member increases and the speed between the stationary and rotating brake clutch members decreases. This will produce a diminished braking torque and an increased driving torque so that a stable speed is again reached. It will be seen, therefore, that in our servomotor system we can produce constant speeds which are a function of the clutching pressure.

One object of our invention is to provide an improved servomotor of the clutch type.

Another object of our invention is to provide a servomotor driven by a motor at constant speed in a single direction capable of producing various output speeds and in reversible directions.

Another object of our invention is to provide a servomotor in which we may obtain various output speeds in accordance with predetermined input signals.

A further object of our invention is to provide a servomotor in which a predetermined output speed will be obtained for a predetermined clutching pressure, which speed will be maintained at a constant point agreeable to the clutching pressure.

A further object of our invention is to provide a servomotor of compact form and yet able to control relatively large loads in response to small signals.

A further object of our invention is to provide a servomotor in which the lag between the incoming signal and the response of the servomotor is reduced to a minimum.

A further object of our invention is to provide a servomotor which is dependable, rugged, and in which the weight of the reversible parts is reduced to a minimum.

Other and further objects of our invention will appear from the following description.

In general, our invention contemplates the provision of a constant speed motor driving two rotating elements in opposite directions. Means normally clutched by a brake to a stationary part are simultaneously unbraked and clutched to one of the oppositely rotating parts in such manner that the direction of rotation is governed by the choice of a clutching electromagnet and the speed of rotation will vary as a function of the current in the electromagnet winding between zero speed and the maximum speed, as determined by the speed of the driving motor.

The clutches used are friction clutches in which the coefficient of friction is substantially a rising function of velocity.

In the accompanying drawings, which form part of the instant specification and which are to be read in conjunction therewith, and in which like reference numerals are used to indicate like parts in the various views:

Figure 3 is a sectional view taken on the line 3—3 of Figure 1.

Figure 4 is a view showing typical dynamic characteristic curves of the servomotor of our invention.

Figure 5 is a view showing typical static characteristic curves of the servomotor of our invention.

Figure 1:
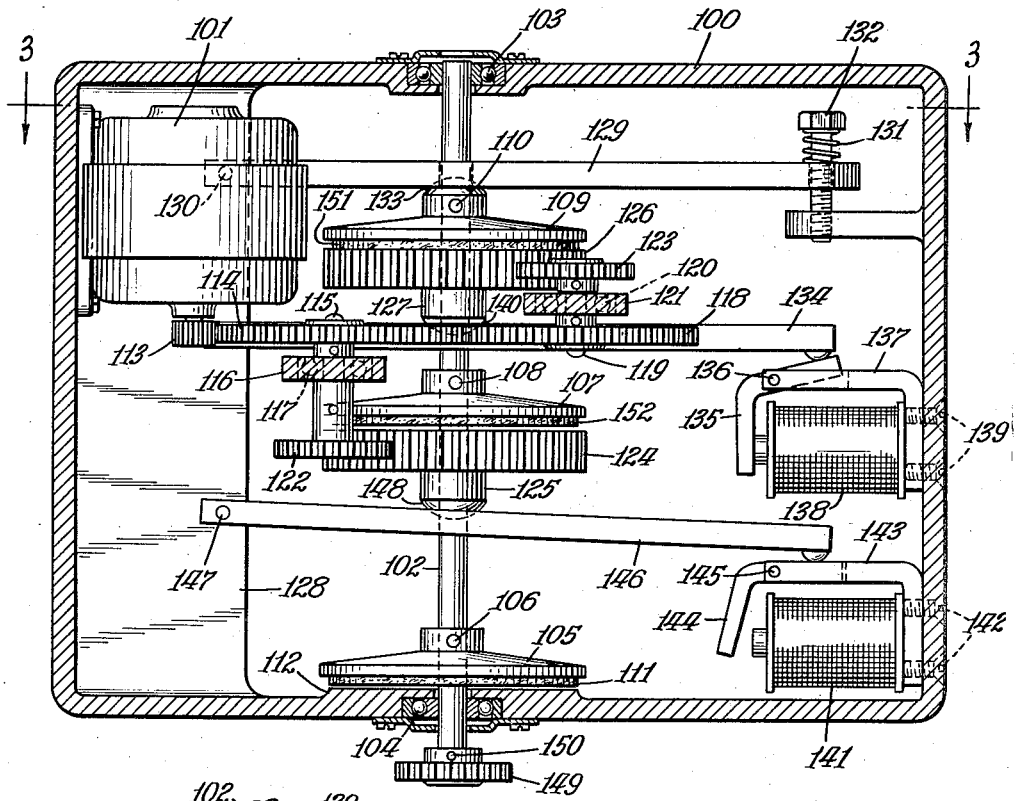
Figure 1 is a sectional plan view of a servomotor showing one embodiment of our invention.
Figure 2:
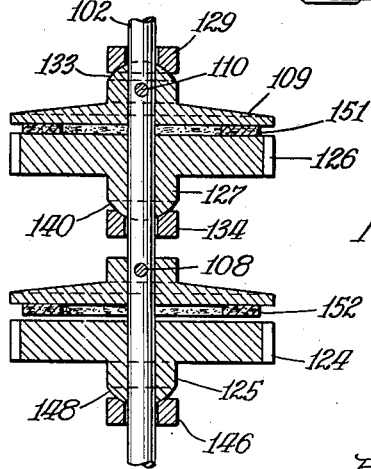
Figure 2 is a sectional view taken on the line 2—2 of Figure 3.

Referring now to the drawings, we provide a housing 100 in which we mount the prime mover, which may be an electric motor 101. A shaft 102 is mounted for rotation in bearings 103 and 104. The shaft 102 is axially movable in its bearings, as well as rotatable. Adjacent one side of the housing, and positioned around the shaft 102, we provide a brake clutch disk 105 which is secured to the shaft 102 by pin 106, or in any other suitable manner.

As a general rule coefficients of friction decrease as the velocity of sliding between two surfaces increases. It is critical in our invention that the inverse of the general rule occur. In other words we choose surfaces such that the coefficient of friction will increase as a function of increased slip velocity, that is, the coefficient of friction will be a rising function of velocity. We have found that cork and leather against metal such as iron, steel, brass, bronze, aluminum and the like have this peculiar effect. The test of the lining material against its cooperating surface for use in our invention is that within the speeds involved and the pressures used the coefficient of friction must be a rising function of velocity. Our tests indicate cork is the best material to use.

Accordingly, clutch disk 107 is secured to the shaft 102 by a pin 108, and is faced with a cork ring 152. Similarly, a clutch disk 109 is secured to the shaft 102 by a pin 110, and is faced with a cork ring 151. The brake clutch disk 105 is faced with a cork ring 111 adapted to co-act with the surface of a boss 112 formed on the housing 100. The motor 101 drives a pinion 113 which meshes with a gear 114 carried by a shaft 115 suitably journaled in a bearing 117 supported by a member 116 carried by the housing 100. The gear 114 meshes with a gear 118 carried by a shaft 119 mounted for rotation in a bearing 120 carried by a member 121 supported by the housing 100. A gear 122 is carried by the shaft 115 for rotation therewith, and a similar gear 123 is carried by the shaft 119 for rotation therewith. The gear 122 meshes with a clutch gear 124 carried by a hub 125 rotatably journaled upon the shaft 102 and mounted for axial movement thereon. In a similar manner, the gear 123 meshes with a clutch gear 126 carried by a hub 127 rotatably mounted on shaft 102 for relative rotation and axial movement therewith. A web 128 is formed in the housing and supports one end of a lever 129 which is pivotally connected around pivot pin 130. The other end of lever 129 is biased to move downwardly, as viewed in Figure 1, by a spring 131, the compression of which may be adjusted by bolt 132. An intermediate point of the lever 129 thrusts against surface 133 formed at the upper end of the clutch disk 109, thus moving the clutch disk and the shaft 102 downwardly, tending to bring cork ring 111 of the brake clutch disk 105 into contact with the stationary surface formed on the boss 112 of the housing. A second lever 134 is pivoted at one end to the web 128. The other end of lever 134 bears against armature 135, which is pivoted around pivot 136 carried by bracket 137. The armature 135 is adapted to be influenced by the electromagnet 138 secured to the housing by screws 139. An intermediate point of the lever 134 bears against a spherical surface 140 formed on the hub 127 of the clutch gear 126. A second electromagnet 141 is mounted on the housing 100 by machine screws 142. A bracket 143 adjacent the electromagnet 141 supports an armature 144 pivoted around pivot pin 145. Both armatures 135 and 144 are bell crank levers, as can readily be seen by reference to Figure 1. A third lever 146 is pivoted to the web at 147. The other end of lever 146 is supported by one arm of the bell crank lever armature 144, as is shown in Figure 1. An intermediate point of the lever 146 bears against a spherical surface 148 formed on the hub 125. A gear 149 outside the housing 100 is secured to the shaft 102 by a pin 150 or in any other suitable manner. The output of the servomotor is delivered through the gear 149, which may be driven by the servomotor in either direction and at varying speeds agreeable to the pressure exerted through the electromagnets 138 and 141 to a limit determined by the speed of motor 101 and the transmission ratio determined by the gearing.

In operation the motor 101 is adapted to be driven at a constant speed and is to run continuously, driving pinion 113. Gear 114 will be driven at a constant speed in one direction, and gear 118 will be driven at a constant speed in the opposite direction. Gear 122 will thus drive clutch gear 124 in one direction, and gear 123 will drive clutch gear 126 in the opposite direction. Both gears 124 and 126 are mounted for rotation about shaft 102. The thrust of spring 131 acting through lever 129 and the surface 133 formed on the hub of clutch disk 109 will thrust the shaft 102 downwardly, as viewed in Figure 1, bringing the cork clutch surface 111 carried by brake clutch disk 105 into contact with the stationary surface formed on the boss 112, thus braking or immobilizing the shaft 102. When it is desired to rotate the output gear 149 in one direction, a signal is applied, energizing the winding of the electromagnet 138. The armature 135 will be attracted to the position shown in Figure 1, thus raising the free end of lever 134, as viewed in Figure 1. The upward motion of the lever moves clutch gear 126 upwardly relative to shaft 102 until engagement is made with the cork ring 151, with which the clutch disk 109 is faced. The upward thrust of the clutch gear 126 also acts to move the clutch disk 109 upwardly against the action of spring 131, thus lessening the pressure of brake disk against the housing. As cork ring 151 makes contact with the clutch plate 109, it will tend to rotate the clutch plate in the direction of rotation of the clutch gear 126. This action is resisted by the braking action between brake boss 112 and the cork ring 111. As the pressure increases the friction between the cork ring 151 and the clutch plate 109 becomes such as to overcome the friction between the cork ring 111 and the brake boss 112. It will be remembered that in our construction the coefficient of friction is a rising function of slip velocity. When the clutch plate 109 is stationary the slip between the clutch gear 126 and the cork ring 151 is at a maximum. The thrust moving the clutch gear upwardly into contact with the clutch plate against the action of spring 131 also acts to move brake plate 105 away from brake boss 112. As the pressure increases the spring 131 is further compressed until the brake plate 105 is moved clear of the brake boss 112. As the clutch plate 109 begins to rotate, the friction between cork ring 151 and clutch gear 126 will drop and the friction between cork ring 111 carried by the brake plate 105 and the brake boss 112 will increase. Before the cork ring 111 of the brake plate is completely free from the brake boss 112, the clutch plate 109 will be driven at its maximum speed and the shaft 102 will rotate in the direction of the clutch gear 126 at this speed.

The maximum torque which can be produced by the brake under rest conditions will be proportional to the relatively low static coefficient of friction, while the torque of the driving clutch will at first be proportional to the large coefficient of friction, corresponding to the condition of one hundred per cent slip. As the pressure on the drive disk is increased, and that on the brake ring is diminished, a point will be reached at which the driving torque exceeds the sum of the braking and load torques and rotation of the output shaft 102 will just begin. A further increase in control pressure will increase the speed of rotation. This speed will be stable since, as the output shaft speed increases, the drive disk slip velocity will drop correspondingly and the brake disk slip velocity will increase correspondingly, hence the drive disk torque will decrease while the brake disk torque will increase as a function of the increase of the output speed. Thus for a given pressure, acceleration of the output shaft will cease when the difference between the driving and braking torques equals the torque load. The output shaft speed which is thus determined in accordance with the applied pressure is hence stable. If the output shaft speed drops, the reverse effect occurs, the braking torque being diminished and the driving torque being increased, thus tending to maintain stability of output speed in either direction.

The action of our servomotor construction is shown graphically in Figure 5, where the output speed $w_1$, as a fraction of the full coupled speed $w_2$, is plotted as the ordinate against the drive disk pressure $p_1$, produced by the control electromagnet, as a fraction of the brake spring pressure $p_2$ as the abscissa. The relative output speed will begin at zero and increase to a maximum at unity. Any further increase of pressure after the maximum speed is reached will not affect the output speed which will then remain constant at full coupled value. The angle A between the curve $C_1$ slope line and the pressure axis is a decreasing function of the factor of increase of friction coefficient with slip velocity. If this factor is zero the friction coefficient is independent of velocity and "on off" action is then indicated by the fact that the angle A equals 90°. By controlling and selecting this velocity friction coefficient factor, the slope of the characteristic may be regulated so as to distribute the increase of output shaft speed over substantially the entire effective signal range, if desired, or in such manner as to produce full output shaft speed in response to a desired fraction of the maximum input signal. It will be noted that the shape of the curve $C_1$ is substantially linear and quite similar to the characteristic curves of vacuum tubes in which plate current is plotted against grid voltage.

Since the selection of a zero signal is arbitary and at the will of the designer, the characteristic may be shifted as desired for a particular application by biasing the electromagnet so that a positive pressure upon the drive clutch disk may exist at a point corresponding to the zero signal. For example, the characteristic curve may be shifted into the position occupied by the curve $C_2$, as shown in Figure 5, in which the continuation of the major straight part of the curve passes through the origin. This may be done by merely arranging the control circuit so that a certain residual current flows through the winding of the control electromagnet under zero signal conditions. The characteristic curve shifts in the direction of the abscissa with the load torque. While relative pressure on the drive disk is used as the abscissa, the curve may be considered as representing the relationship between the output speed and the input current to the control electromagnet. By suitable design of the control electromagnets, a substantially linear relationship between input current and clutching pressure may be obtained and, under such conditions, the static characteristic curve will have the same form when graphed in terms of input signal current as when graphed against pressure. If the control electromagnet is biased so as to produce a characteristic, such as the curve $C_2$, or any other desired shifted characteristic curve, the signal will, of course, be measured against the biasing current instead of against zero current as a reference point. Where a non-linear characteristic curve is desired to meet special conditions, it may be produced by varying the electromagnet and clutch construction, thus varying the relation between pressure and input signal current.

While cooperating surfaces may take spherical or conical forms, flat surfaces are simpler in construction and we prefer to use them. With our construction, we are enabled to produce servomotors utilizing very small electromagnet armature movements in passing from zero signal to full output signal, thus reducing the lag between the input signal and the output response. It will be seen therefore that we have in effect provided a servomotor which is responsive to pressure in counter-distinction to those servomotors which operate as a function of displacement, and in fact the clutch and brake surfaces may be constantly in contact. In displacement operated devices, there is an inherently greater lag.

Figure 4 shows a dynamic characteristic for a servomotor embodying our invention. A sinusoidal input signal S is applied against a plurality of characteristic curves $C_3$, $C_4$, $C_5$, $C_6$, and $C_7$, similar to characteristic curves $C_1$ and $C_2$, as shown in Figure 5, and corresponding to various torques $T_3$, $T_4$, $T_5$, $T_6$, and $T_7$. The resulting output speed characteristic has the form of an ellipse Y having a minor axis $d$ and a major axis D. The minor axis $d$ depends upon the time constant of the device. The theoretically ideal linear characteristic would correspond to the major axis D and the rapidity of the response of the device is such that the minor axis $d$ may be reduced to a point where an excellent approximation of this condition is obtained. Under the assumption of the linearity of the friction velocity characteristic of the elements and similarity of driving and braking elements, the dynamic characteristic in response to a suddenly imposed sinusoidal signal is composed of a term representing the original output velocity, which decays rapidly and exponentially to zero and a sinusoidal term having a phase difference depending on the time constant of the device. This time constant is equal to the moment of inertia reduced to the output shaft multiplied by the full coupled speed and divided by the braking torque for the full braking pressure, and by the percentage increase in the coefficient of friction at maximum slip velocity. The time constant accordingly may be reduced by increasing the velocity coefficient of friction. Our servomotor construction has a very small time constant without an external load. An additional lag is introduced by the electromagnetic control system, but this is very low so that the over-all time constant of our servomotor is extremely small.

When the signal energizing the winding of electromagnet 138 ceases, the spring 131 again brings the clutch brake into engagement. Upon the energization of the winding of electromagnet 141 a similar action takes place, moving the clutch gear 124 upwardly into contact with the cork facing 152 of the clutch disk 107. When the clutch disk 107 is coupled to the clutch gear 124 the shaft 102 will rotate in a direction reverse to that which followed when clutch gear 126 was clutched to clutch disk 109, due to the fact that clutch gear 124 is rotating in a direction reverse to that of clutch gear 126.

We have shown the cork ring facings secured to the clutch and brake disks. If desired they may be secured to the clutch gears 126 and 124 and to the braking boss 112, instead of as shown, and the clutch and brake disks may present metal surfaces.

It will be seen that we have accomplished the objects of our invention. We have provided an improved servomotor of the clutch type in which a motor is driven at a constant speed in a single direction and which is capable of producing output responses at various speeds and in reversible directions. We are enabled to obtain various speeds in accordance with predetermined input signals, and such speeds are maintained at a constant point agreeable to the clutching pressure. Our servomotor is compact in form and is able nevertheless to control relatively large output forces in response to comparatively small input signals. In our servomotor the lag between the incoming signal and the output response is kept at a minimum. Our servomotor is dependable, rugged, and the weights of the reversible parts are reduced to a minimum.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

Having thus described our invention, we claim:

1. A servomotor including in combination a prime mover, a pair of friction clutches each having driving and driven elements, means for rotating the driving elements in opposite directions from the prime mover, an output shaft, means for mounting the output shaft for axial movement, a friction brake secured to the output shaft for normally immobilizing the same, biasing means for moving the shaft axially to braking position, means operatively connecting the output shaft with the driven clutch elements, means for selectively engaging one of the driven and driving clutch elements and for simultaneously moving the output shaft axially against the action of said biasing means through the clutch-engaging force whereby the brake is released during said engagement.

2. A servomotor as in claim 1 in which the engaging friction surfaces of said clutches and said friction braking means have friction surfaces having dynamic coefficients of friction rising as a function of slip velocity.

3. A servomotor including in combination a prime mover, a pair of friction clutches having driving and driven elements, said driving elements comprising a pair of oppositely rotating gears driven from a prime mover, an output shaft, means for mounting said output shaft for movement axially thereof, means operatively connecting the driven clutch elements to the output shaft, a friction brake carried by the output shaft for normally immobilizing the same, biasing means for biasing the output shaft axially normally to engage said brake, thrust means responsive to an electric current for selectively clutching one of said driving clutch elements with one of said driven elements and for simultaneously moving the output shaft axially against the action of the biasing means through said clutch-engaging force to release the friction brake, the dynamic coefficients of friction of the friction clutches rising as a function of slip velocity.

4. A servomotor as in claim 3 in which each of said friction clutches has a surface comprising cork.

5. A servomotor as in claim 3 including in combination spring means biasing said friction brake to braking position.

6. A servomotor as in claim 3 including in combination spring means biasing said friction brake to braking position, and means for adjusting the force of said spring means.

7. A servomotor as in claim 3 in which said thrust means comprises an electromagnet.

8. A servomotor, including in combination a housing, a shaft mounted for rotation and axial movement in said housing, a pair of gears mounted slidably on and for relative rotation with said shaft, means for driving said gears in opposite directions, a pair of clutch disks carried by said shaft for rotation therewith and positioned in proximity to said gears, a brake disk mounted on said shaft for rotation therewith and mounted in proximity to a stationary portion of said housing, means normally biasing said shaft axially whereby to engage said brake disk with said stationary housing portion to immobilize said shaft, a pair of thrust means selectively adapted to move said gears axially of said shaft into engagement with said clutch disks and to move said shaft axially of the housing whereby to unbrake said brake disk.

9. A servomotor as in claim 8 in which one of the engaging surfaces between each of said clutch disks and each of said gears comprises cork.

10. A servomotor as in claim 8 in which one of the engaging surfaces between said brake disk and said stationary housing portion comprises cork.

11. A servomotor as in claim 8 in which one of the engaging surfaces between said clutch disk and said gears and said brake disk and said stationary housing portion comprises cork.

12. A servomotor as in claim 8 in which said thrust means comprises a pair of electromagnets.

CARL L. NORDEN.
THEODORE H. BARTH.

REFERENCES CITED

The following references are of record in the file of this patent:

UNITED STATES PATENTS

| Number | Name | Date |
| --- | --- | --- |
| 744,249 | Shore | Nov. 17, 1903 |
| 843,076 | Detrick | Feb. 5, 1907 |
| 847,754 | Flinchbaugh | Mar. 19, 1907 |
| 990,999 | McGuire | May 2, 1911 |
| 1,751,647 | Nieman | Mar. 25, 1930 |
| 2,175,382 | Eason | Oct. 10, 1939 |
| 2,311,321 | Zigan | Feb. 16, 1942 |
| 2,391,123 | Corliss | Dec. 18, 1945 |